Nov. 14, 1939.  H. P. SMITH  2,180,124
ADJUSTING MECHANISM FOR TRACTOR IMPLEMENTS
Original Filed Nov. 7, 1936  4 Sheets-Sheet 1

Inventor
Hiram P. Smith

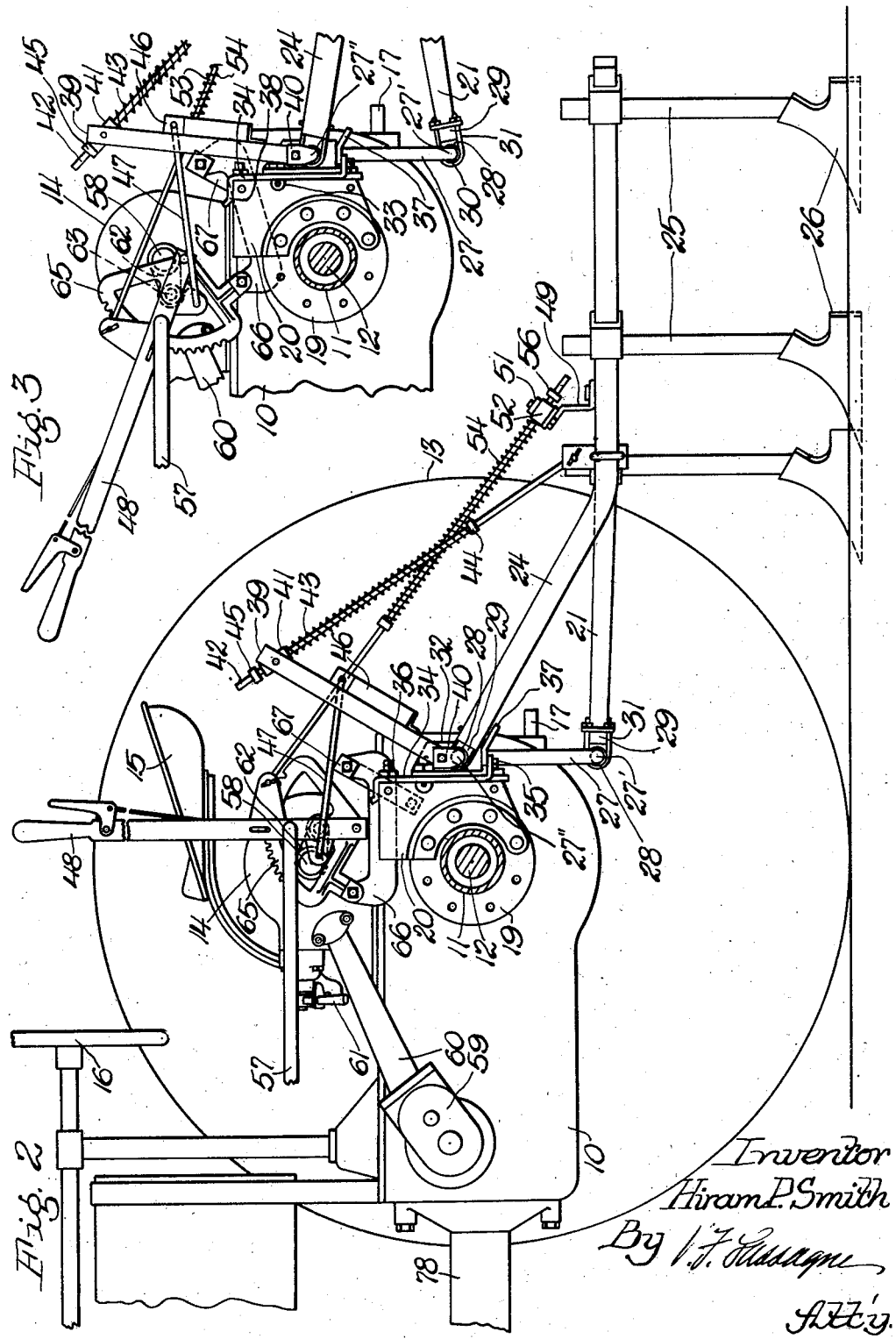

Nov. 14, 1939. H. P. SMITH 2,180,124
ADJUSTING MECHANISM FOR TRACTOR IMPLEMENTS
Original Filed Nov. 7, 1936 4 Sheets-Sheet 3
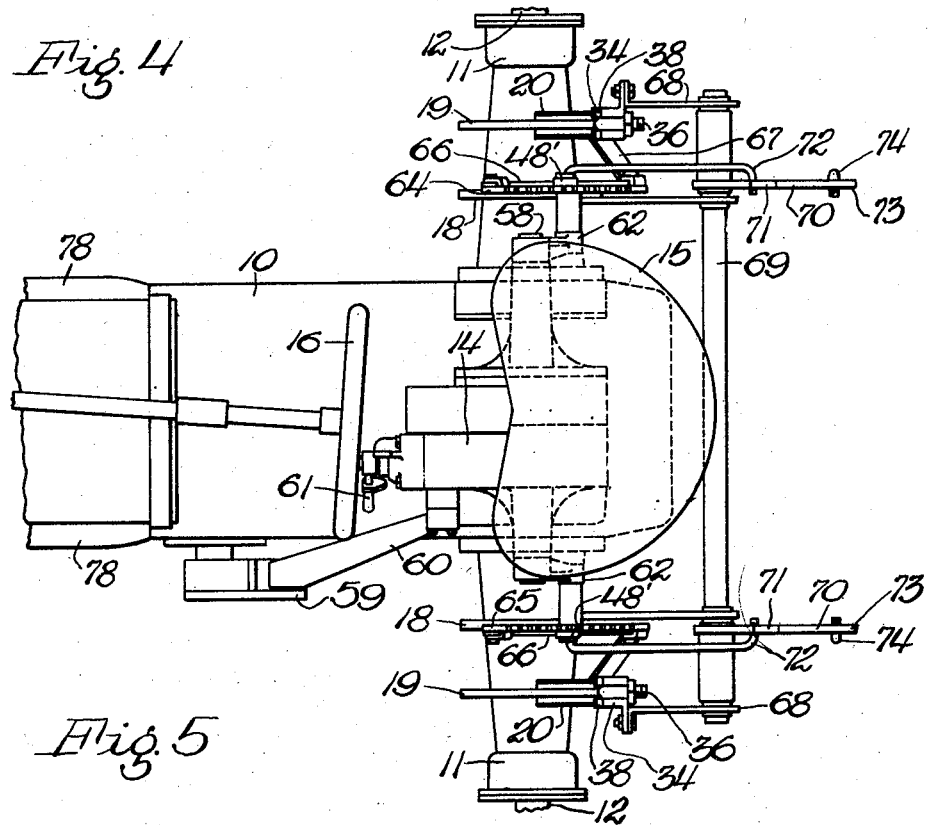
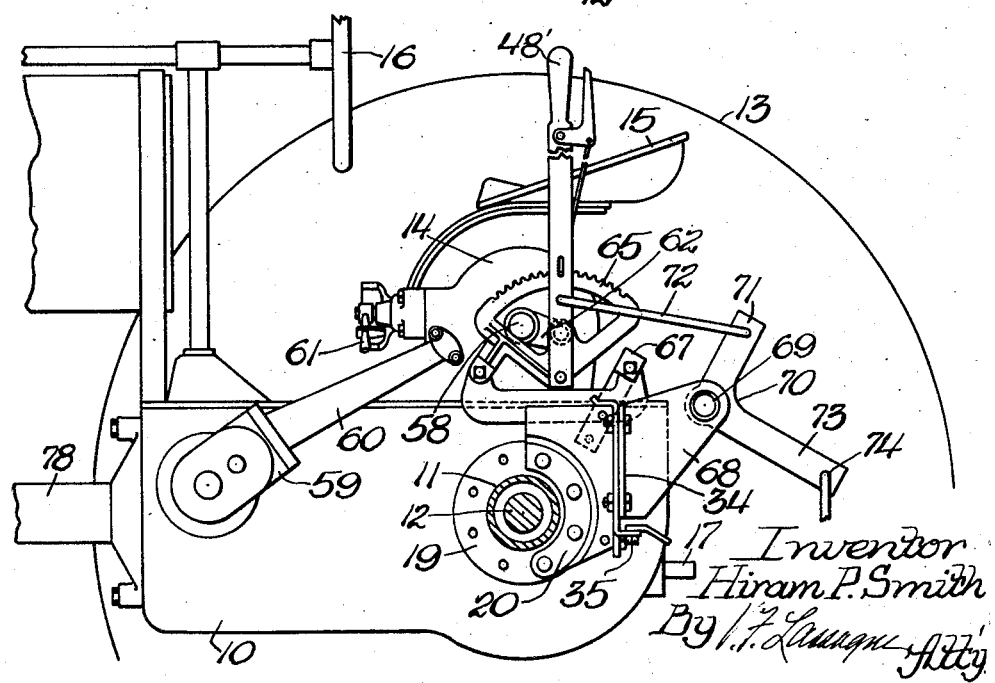

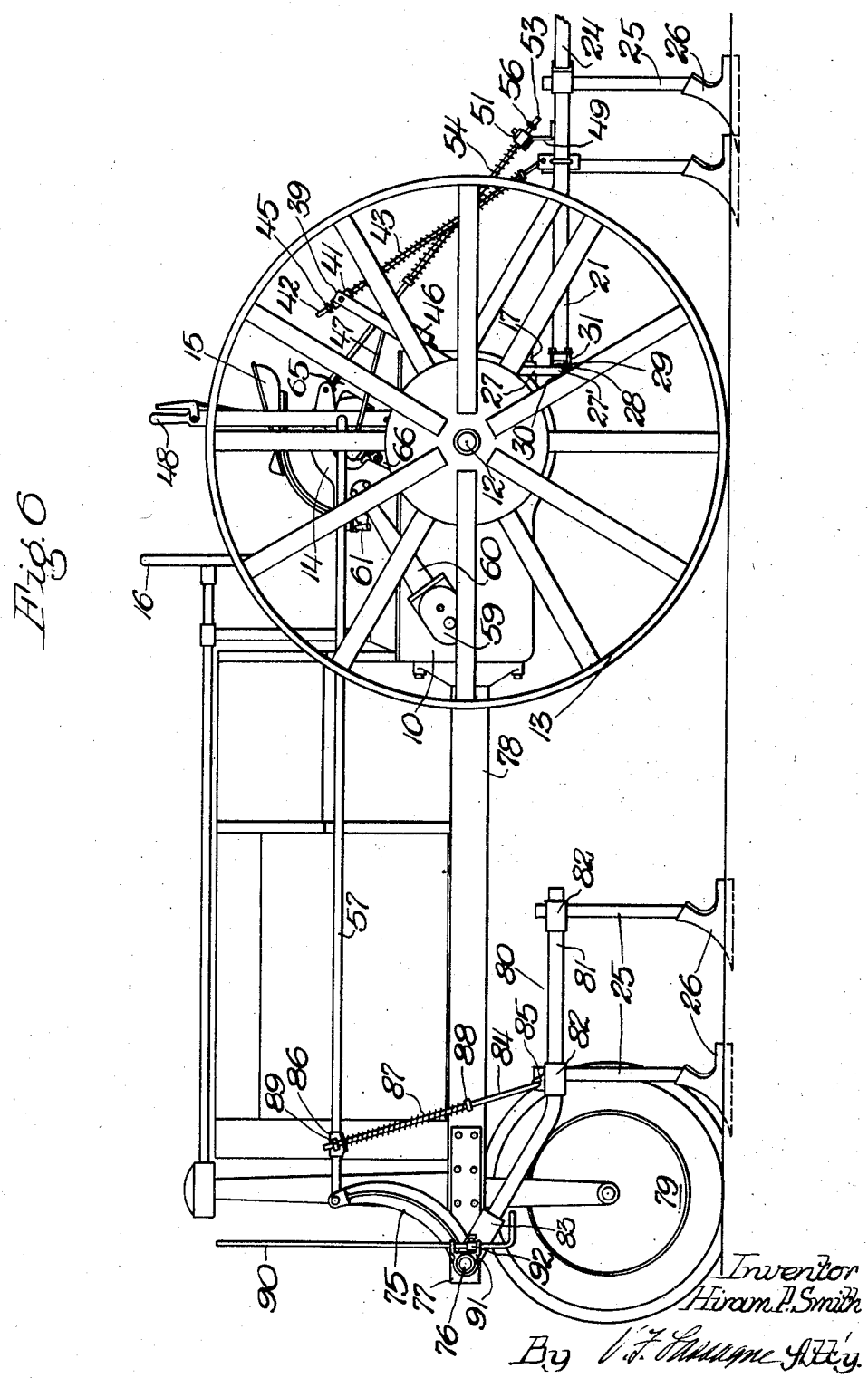

UNITED STATES PATENT OFFICE 2,180,124

ADJUSTING MECHANISM FOR TRACTOR IMPLEMENTS

Hiram P. Smith, Canton, Ill., assignor to International Harvester Company, a corporation of New Jersey Application November 7, 1936, Serial No. 109,622
Renewed June 14, 1939

14 Claims. (Cl. 97—50)

This invention relates to a power lift attachment for tractors carrying implements mounted thereon.

The main object of the invention is to provide a tractor of the general purpose type with a special implement raising and lowering mechanism whereby forwardly and rearwardly mounted cultivator attachments may be raised and lowered successively upon operation of the power lift.

Another object of the invention is to provide a manually actuated adjusting means which may be mounted directly on the power lift mechanism.

Another object is to provide adjusting means whereby the working depth of the front and rear tillage tolls may be simultaneously adjusted.

Another object is to provide adjusting means in which the levers for adjusting the front or rear gangs do not swing with respect to the tractor gangs but move longitudinally.

Another object of the invention is to provide adjusting means whereby the connections to the front and rear gangs are so connected to the lifting mechanism that, as the lifting mechanism moves with uniform motion of rotation about a given axis, the connections to the front gang have a maximum speed at the beginning of their movement, which reduces to zero at the end of the movement, while the connections to the rear gang move at a slow rate of speed at the beginning of their movement and finish at a high rate of speed. It will be apparent from the description to follow concerning the movement of the connecting points of the front and rear implement gangs that the front implements will be raised from the ground first, and the rear implements will follow, so that, as the tractor reaches the end of the field and as the lift mechanism is put in operation, the rear implement gangs will continue to cultivate to the end of the row.

These and other objects, which will be apparent from the detailed description to follow, are accomplished by a construction as shown in the drawings, in which:

Figure 2 is a side elevation of the tractor with the left rear wheel removed, showing the raising and lowering mechanism and the adjusting mechanism for front and rear implements in ground engaging position;

Figure 3 is a detailed portion of the raising and lowering mechanism with its adjusting mechanism shown in its raised position with the connections to the front and rear implements in their raised position;

Figure 4 is a modification of the raising and lowering mechanism and its adjusting mechanism connected to a rock-shaft suitable for raising and lowering attached implements;

Figure 5 is a side elevation with the left rear wheel removed, showing the raising and lowering mechanism depicted in Figure 4; and, Figure 6 is a side elevation of a tractor of the general purpose type having front and rear implement gangs operated by the raising and lowering mechanism.

Figure 1:
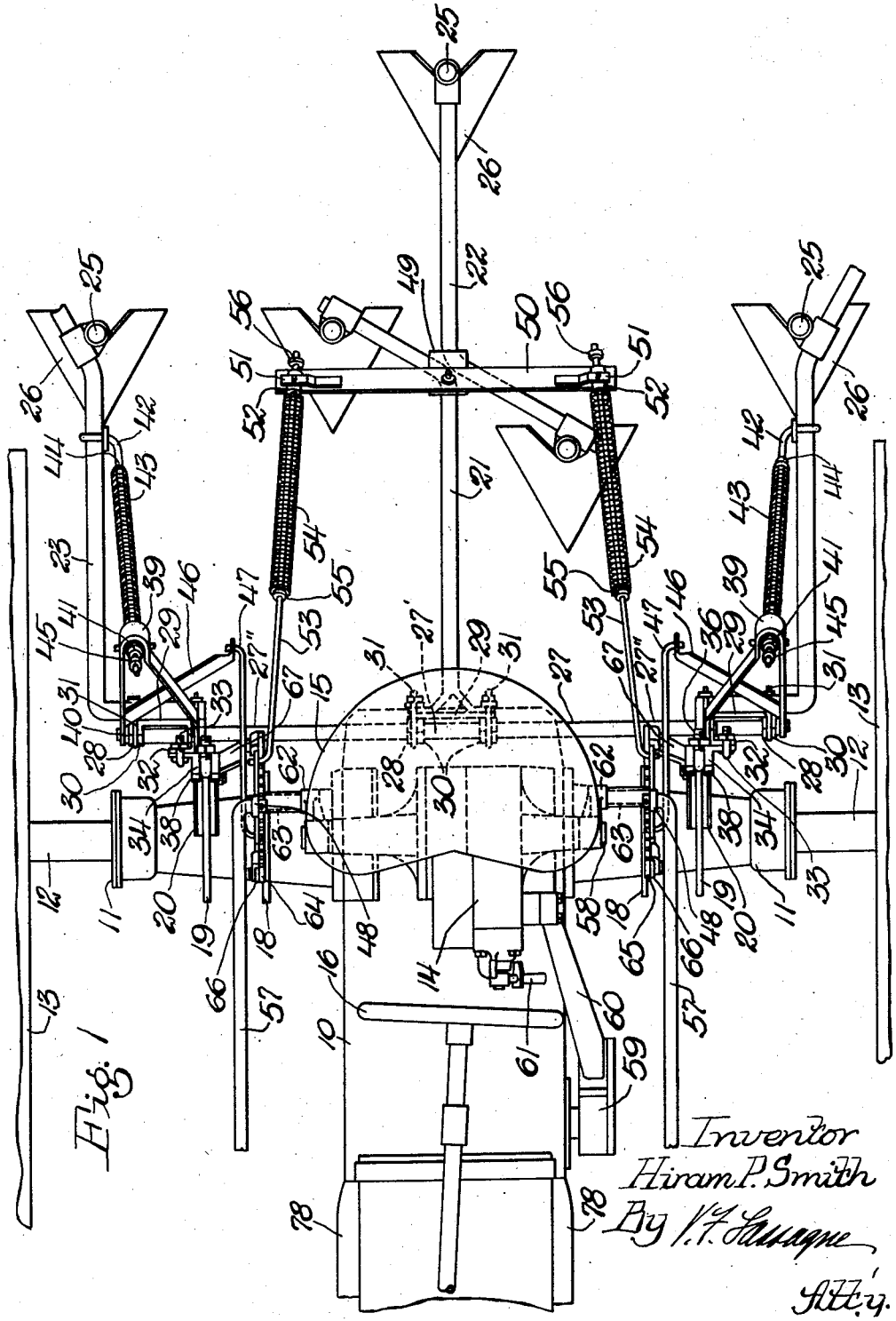
Figure 1 is a plan view of the rear portion of a tractor of the general purpose type, showing the raising and lowering mechanism with a separate adjusting mechanism connected to fore and aft raising and lowering connections.

In the construction illustrated, a tractor or wheeled frame of a well known tricycle type is disclosed having a casing 10 forming the rear end of the tractor body and containing the transmission and differential mechanism. The rear portion of this casing has bolted or otherwise secured to it on each side, aligned tubular axle housings 11 containing bearings for axle shafts 12, which extend beyond the ends of the housings. Traction wheels 13 are adjustably mounted on the axle ends. The casing 10 supports a power lift mechanism 14, providing means for simultaneously raising and lowering cultivator or implement gangs from ground engaging to transport position, as shown in the patent to E. A. Johnston No. 2,039,801 granted May 5, 1936, and in his Patent No. 2,095,876, granted October 12, 1937. A centrally located driver's seat 15 is mounted on the power lift mechanism in convenient relation to the usual steering wheel 16 and other controls, not shown.

The casing 10 has suitable bearings in its lower portion for a central power take-off shaft 17, which projects from the rear wall thereof and is driven by suitable gearing within the casing. Cast integrally on the axle housings 11 are inner and outer flanges 18 and 19. Secured to the outer flanges 19 are vertically disposed, laterally spaced, parallel plates 20, to which quick attachable and detachable cultivator implements or any other type of implement may be secured.

In the present invention, the rear connected cultivator implement is similar to the structure shown in applicant's Patent No. 2,005,568, granted June 18, 1935. This cultivator implement, now to be described, is an improvement on the above and is composed of three separate cultivator gangs arranged in straddling relation to the rows spanned by the wheels. One of the gangs is intermediately mounted and the other two gangs are mounted to the right and left sides thereof in such a manner as to permit the cultivator shovels carried thereby to cultivate behind the wheel treads.

The intermediate gang beam is made up of two rearwardly extending parts 21 and 22, welded or otherwise fastened together in rigid tandem relationship. Each of the parts has a laterally extending portion, to which the usual cultivator shovels may be attached. There are two side gang beams 23 and 24, as well as the intermediate gang beams 21 and 22, and all beams have cultivator standards 25 and their associated cultivator shovels 26 attached thereto. The cultivator beams 21, 22, 23 and 24 are all pivotally connected at their forward ends to a transverse supporting means 27, as best shown in Figures 1, 2 and 3. The transverse supporting means 27 has a downwardly arched, central portion 27', to which the central beam 21 is connected. The beams 23 and 24 are pivotally mounted to the laterally extending portions 27" of the member 27. In each instance, the beams 21, 22, 23, 24 are secured by clamping to bearing members 28 journaled on the transverse supporting means 27. The bearing member 28 comprises a main bearing portion 29 to which the beams 21, 22, 23 and 24 are secured. The main portion 29 has two laterally spaced half bearing portions to which are clamped caps 30 by U-bolts 31. It is obvious that in this construction means is provided for mounting the implement gangs so that the beams are free to pivot about the transverse supporting means 27. The transverse supporting means 27 has two laterally spaced, rear cultivator attaching members 32 welded or otherwise rigidly secured thereto. The bearing members 28 supporting the side gangs 23 and 24 are journaled so that the attaching members 32 on the supporting means 27 are between the laterally spaced bearing portions of the main bearing portion 29. The attaching members 32 provide means whereby the rear cultivator implement may be quickly attached to or detached from the tractor. This quick attaching and detaching member 32 is provided with a usual slot for receiving swinging eye bolts 33 pivoted on main attaching pieces 34, which, in turn, may be quickly attached or detached from the vertically disposed, laterally spaced, parallel plates 20 by lower and upper swing bolts 35 and 36, respectively. The rear cultivator implement comprises all of the parts up to and including the attaching members 32, and may be detached as a whole from the main pieces 34 by means of swinging bolts 33, to attach another implement, or to leave it free for cultivating only with the front implement. The main attaching pieces 34 thus remain on the tractor and carry parts to be used when the front implement is being used alone. In attaching the rear cultivator implement to the main attaching pieces 34, upwardly inclined guide shelf portions 37, welded to the bottom end of each main attaching piece 34, provide means for guiding the rear attaching piece 32 of the cultivator implement onto the tractor as the tractor is backed into position for attaching the implement. The cultivator is then attached by swinging the bolts 33 and securing them in position. A guide means 38 on the upper ends of the main attaching pieces 34, made by turning down a portion of the piece 34, provides means for assisting in attaching the pieces 34 to the parallel plates 20. When the pieces 34 are in position to be fixed to the parallel plates 20, the swinging eye bolts 35 and 36 are swung into slots in the pieces 34 and tightened to secure the pieces in position on the tractor.

The side gangs 23 and 24 may be raised and lowered from ground engaging to transport position by means of inverted U-shaped lifting arms 39 operable to and fro on transverse supporting means 27. The transverse supporting means 27 at its outer ends has upturned portions 40, to which the lifting arms for each of the rear side gangs are pivoted. The lifting arms 39 are also pivotally attached to the spaced attaching members 32. At the upper portion of the U-shaped lifting arm 39, there is pivotally mounted a lost motion trunnion connection 41. Pivotally attached to the implement gangs 23, 24 are pressure lifting rods 42. The pressure rods 42 are slidably mounted in the lost motion connections 41. Pressure springs 43 are adjustably mounted on each pressure rod 42 by means of adjusting collars 44. Adjusting collars 45 on the rods 42, as the implement gangs are raised, engage the lost motion connections 41 to lift the side gangs and also function to limit the maximum soil working depth of the implement gangs when in ground engaging position. Extending rearwardly and inwardly and secured to each of the lifting arms 39 is an extending portion 46, to which a lifting link 47 is pivotally connected for providing connecting means between the cultivator gangs and a manually actuated depth adjusting means. The lifting links 47 extend forwardly and are pivotally connected at their forward ends to adjusting levers 48 on each of the two manually actuated means, which are mounted one at each side of the operator's station 15 within convenient reach thereof. The intermediate cultivator gang 21—22 has an upright support 49 secured thereto. Pivotally mounted at its upper end is a transverse equalizer bar 50. Laterally spaced on the equalizer bar 50 are strap portions 51 forming with the transverse member 50 supports for the laterally positioned lost motion trunnion connections 52 pivotally mounted therein. Pressure rods 53 are slidably mounted in the lost motion connections at their lower ends, and at their upper ends are pivotally attached to the adjusting levers 48 on each side of the tractor. Pressure springs 54 are mounted on the pressure rods 53 and are held in adjusted position by adjusting collars 55. Stop collars 56 are adjustably mounted on the lower ends of the pressure rods 53. The stop collars 56 engage the lost motion connections 51 as the implement gang 21 is raised and serve to limit the depth of the gang in each adjusted position.

With the arrangement described, it will be seen that each lever 48 will act to lift and lower the intermediate gang 21—22 through the equalizer bar, or equalizing means, 50 and that this equalizer bar 50 will act as a differential member dividing the lifting effort between the two hand levers 48, and said hand levers are operated successively; that is to say,—if the lever 48 on the right hand side is swung forwardly to lift the right side gang, the equalizer bar 50 will fulcrum on the lifting link of the opposite lever and the full movement of the hand lever 48 will effect a half lift of the intermediate gang, after which, actuation of the hand lever on the left side of the tractor to lift the left gang will effect the second half of the lifting movement in the same manner. The steps of the lifting movement are best illustrated in applicant's U. S. Patent No.

2,005,568, granted June 18, 1935, and the cultivator implement of this application is a species of the cultivator construction claimed in applicant's prior patent. The structure is one, therefore, in which the effort necessary to raise the rear implement as a whole is evenly divided between two lifting devices or hand levers.

The front cultivator construction may be of any conventional construction, but for the purpose of disclosure the construction as shown in Figure 6 is used. As push bars 57 are adapted to connect front cultivator gangs to the adjusting levers 48, it is obvious that upon the actuation of the adjusting lever 48 to adjust the rear cultivator gangs, the front cultivator gangs are correspondingly adjusted. The adjusting levers 48, being positioned on each side of the tractor, permit a portion of the forward, and a portion of the rear cultivator attachment on each side of the tractor to be separately adjusted. It is also obvious that the operator, by actuating both levers 48, may simultaneously adjust the right and left hand side of the front and rear cultivator implements together.

Power lift mechanism, preferably in the form of a hydraulic lift mechanism 14, has been provided for raising and lowering the front and rear cultivator implements from ground engaging to transport position. The hydraulic lift mechanism 14 is disclosed in the copending application Serial No. 87,889, of E. A. Johnston referred to above. The hydraulic lifting mechanism 14 is mounted at the rear of the tractor and has an oscillatory, transverse, output shaft means 58, providing means adapted to be operated to and fro for raising and lowering the cultivator or implement gangs from ground engaging to transport position actuated from the motor of the tractor by means of a pump 59 driven from a power take-off shaft connected to the motor of the tractor. Passages from the pump to the hydraulic lift mechanism are cored in a housing or pipe 60. The mechanism is actuated by a control handle 61 positioned within reach of the operator's station 15. Extending from each side of the hydraulic lift mechanism is the oscillatory, transverse shaft 58. Mounted on each end of the shaft 58 are crank arms 62. Extending laterally from the crank arms 62 are crank pins 63 providing crank means laterally spaced on the oscillatory shaft 58, as best shown in Figures 1, 2 and 3.

Pivotally mounted on the right and left crank pins 63, respectively, are adjusting quadrants 64 and 65, which, taken with an associated lever 48, provide manual actuated means for adjusting the working depth of the cultivator implements. As the adjusting quadrants and their associated levers 48 are the same for each side of the tractor, only one will be described, and like parts will be denoted by similar reference characters. The adjusting quadrants 64 and 65 have the usual adjusting teeth thereon, about which the adjusting levers may be adjusted by the usual thumb latch and detent. Since the adjusting quadrants are journaled on each crank pin 63 for free oscillatory movement with respect thereto, means is provided which connects the manually actuated means directly to power lift mechanism. As the hydraulic lifting mechanism is actuated to lift the implements to their transport position, as shown in Figure 3, or to lower the implements to their ground engaging position shown in Figure 2, the crank arm and its attached crank pin is free to move and takes the adjusting quadrant with it.

As shown in Figure 2, the adjusting quadrant 64 is symmetrically positioned on each side of the crank pin 63. In this position, it is obvious that the adjusting lever 48, which is pivotally mounted on the adjusting quadrant below the point of connection of the adjusting quadrant to the crank pin, may be adjusted equally in each direction, so that the implements may be raised or lowered to adjust the working depth of the cultivator shovels. To restrain the movement of the adjusting quadrants, as they move from their ground engaging to transport position, pivoted links 66 connect each adjusting quadrant to a fixed support 67, mounted on each main attaching piece 34. The point of connection of the forward portions of the pivoted links 66 to each adjusting quadrant is ahead of the point of connection of the adjusting lever to the adjusting quadrant and of the adjusting quadrant to the crank arm 62 in the ground engaging position of the implement attachments. The pivoted links are also connected to the adjusting quadrants ahead of the axis of the oscillatory shaft 58. Similarly, the point of connection of the pivoted links 66 to their fixed supports 67 is to the rear of the connection of the adjusting lever to the adjusting quadrant and the point of connection of the adjusting quadrant to the crank arm in its ground engaging position. Vertically, the point of connection of the pivoted link to the fixed support 67 lies midway between the pivot connections of the adjusting lever to the quadrant and the quadrant to the crank arm. The pivoted link 66 lies below the adjusting quadrant and below the connection of the adjusting lever to the adjusting quadrant.

In the ground engaging position of the cultivator implement the connection of the rear end of the push bar 57 with the adjusting lever 48 in its neutral position at the center of the adjusting quadrant lies on the same vertical line as the point of connection of the adjusting lever to the adjusting quadrant and of the adjusting quadrant to the crank arm. In this ground engaging position of the cultivator attachment, the connecting link 47 for the lifting arms 39 is pivoted at its forward end ahead of the connections of the push bar to the adjusting lever, of the adjusting lever to the adjusting quadrant, and of the adjusting quadrant to the crank arm. The pressure rods 53 are connected to the lifting lever 48 to the rear of the connections of the push bar to the adjusting lever, of the adjusting lever to the adjusting quadrant, and of the adjusting quadrant to the crank arm.

Figure 3 shows the position of the adjusting mechanism in its raised or transport position, and particularly the final positions of the push bar 57, the lifting link 47, and the pressure rods 53. The oscillatory shaft 58 and its crank arm 62 rotate with uniform motion through an arc of substantially 215 degrees when the cultivator implements are lifted from the ground engaging position shown in Figure 2 to the raised or transport position shown in Figure 3. As the crank arm 62 moves through its arc of 215 degrees with respect to the axis of the shaft 58 of the hydraulic lift mechanism, the point of connection of the push bar 57 will be displaced approximately 86 degrees with respect to the same shaft axis. Similarly, the point of connection of the pressure rod 53 connected to the intermediate gang will be displaced approximately 79 degrees, and, while the point of connection of the lifting links 47 connecting the side rear implement gangs will have moved approximately 260 degrees, the link 66 will pivot very little about its pivot point on the support 67. It will pivot only sufficiently to guide and limit the throw of the quadrant as the crank 62 operates to move the quadrant and its points of connection on the lever 48 forwardly. This guiding effect of the link 66 cooperating with the manually actuated means produces the desired successive movement of the front and rear implements. As the operator actuates the valve 61 of the hydraulic mechanism, the front and rear implements start to rise at the same time, as they are connected to the same lifting mechanism, but, since the point of connection of the push bar 57 with respect to the shaft axis 58 is of greater radial distance therefrom than the point of connection of the rear lifting link 47, and also since the resultant horizontal distance of travel that the point of connection for the push bar 57 has to move is greater than the resultant distance that the point of connection of the lifting link 47 has to move, with the same throw of the crank means, the front gangs will raise quicker than the rear gangs, thus providing a successive operation of front and rear implements during movement in one direction of the oscillation of the transverse shaft 58 of the power lift. For the same reasons, and acting in the same manner, the front and rear implements will be lowered successively upon movement of the shaft axis 58 in the return direction of the oscillatory movement. Thus, the front cultivator gangs will lift out of the ground first as the end of the row is reached, then the rear cultivator gangs will finish cultivating to the end of the row before they are completely lifted. In this manner, both the front and rear cultivator gangs cultivate throughout the entire row, and an uncultivated space is not left by the rear gangs at the end of the row.

In one sense it may be said that the manually actuated means, the guiding link 66, and the crank means provide means for so connecting the implements to the power lift device that successive operation of the front and rear implements will be effected as the power lift device is operated. In brief, the raising of the front and rear cultivator gangs takes place as follows:

The front and rear implement gangs start at the same time. Then, the front implement gangs rapidly rise from the ground to approximately their maximum position. As the tractor travels forward, because of the connections to the rear implement gangs, the rear implement gangs are elevated very slowly during the first part of the movement, so that they cultivate approximately to the end of the row, whereupon their elevating movement is very rapid to approximately their maximum elevation. Then, as both the front and the rear side gangs assume approximately their maximum elevation, the intermediate gang is lifted. The remainder of the movement of the implement gangs is very slow, so that the final maximum position of all of the gangs is reached at the same time. It may well be noted that, while the point of connection of the lifting link 47 actually moves through approximately 260 degrees, it is only effective while moving about 125 degrees of this amount. This point of connection is so near to the axis of the shaft 58 in moving through 135 degrees, at the start of the lifting movement, that there is little resulting horizontal movement at this time. It is also to be noted that each point of connection of a lifting link will have a separate path of movement.

In the modification shown in Figures 4 and 5, the same hydraulic lift mechanism and adjusting mechanism is used. However, the lifting mechanism has been connected to a transverse rock-shaft mounted at the rear of the tractor for the purpose of raising and lowering other types of rear connected implements. As all of the parts of the hydraulic lifting mechanism are the same, like references will denote similar parts as already previously described. As shown in Figures 4 and 5, quick attachable supporting members 68 are coupled to the parallel plates 20 in the usual manner by the swinging bolts 35 and 36. Supported from the supporting members 68 is a transverse rock-shaft 69 providing oscillatory means mounted on the vehicle. Mounted for oscillatory movement on the transverse rock-shaft 69 are lifting arms 70 in the form of bell crank levers. To upper portions 71 of the lifting arms 70 are pivotally connected lifting links 72, which extend forwardly and are pivotally attached to the adjusting lever 48'. Depending from rear portions 73 of the lifting arm 70 are lifting rods 74, which are connected to any rear mounted implement gang or frame to be raised and lowered.

The operation of the hydraulic raising and lowering mechanism is the same as that described for Figures 1, 2 and 3. However, in this instance it will correspond to the portion of the implement gangs which was raised by the push bar 57, as best shown in Figures 2 and 3, since the lifting links 72 are connected to the lever 48' at the point where the push bar 57 was connected. As the operator actuates the control valve 61, the hydraulic lifting mechanism is oscillated uniformly through approximately 215 degrees and the point of connection of the lifting link 72 is displaced approximately 86 degrees with respect to the axis of the hydraulic lifting mechanism, therefor lifting any implement gang or frame which is connected to the lifting rods or links 74.

Figure 6 shows a tractor of the general purpose type having implement gangs connected to the front and rear ends thereof. The rear implement gangs are the same as were previously described and shown in Figures 1 and 2. As the rear implement gangs have been previously described, like reference characters will denote similar parts. As previously stated, the push bars 57 extend forwardly adjacent the sides of the tractor where they are connected to an upwardly extending lever arm or rocker arm 75. The rocker arm 75 is pivotally mounted on a transverse support 76 extending laterally across the front end of the tractor. The transverse support 76 is supported at the front end of the tractor by forwardly extending supporting brackets 77 bolted or otherwise secured to side sills 78 of the tractor. Mounted on each side of the front steering truck 79 are implement gangs 80. As the implement gangs 80 are similar in construction on each side of the tractor, only one will be described, and like reference characters will denote similar parts. The implement gangs 80 comprise the usual standards 25 and shovels 26 which are secured to a forwardly extending beam 81 by the usual clamp brackets 82. The beam 81 extends forwardly to where it is pivoted to the transverse support 76 by a connecting piece 83. Pressure rods 84 extend downwardly from the forward end of the push rod 57 to where they are pivotally attached to the beam 81 at their lower ends by a bracket 85. The pressure rods 84 are slidably mounted at their upper ends in a connecting bracket 86 secured to the push bar 57. Pressure springs 87 are mounted on the pressure rods 84 in the usual manner and are adjusted by adjusting collars 88. The adjusting collars 88 are slidably mounted on the pressure rods 84 and may be held in adjusted position by set screws. Adjusting collars 89 are also mounted on the pressure rods at their upper ends and are adapted to be engaged by the connecting bracket member 86 when the gangs are lifted.

The gangs may be readily detached from the forward end of the tractor and in their detached position may be supported for subsequent attaching by adjusting standards or supports 90 mounted on each end of the transverse support 76. The standards 90 are held in their adjusted positions by means of brackets 91 mounted at each end of the transverse support 76 and adjusting collars 92 engaging the brackets 91.

As the front implement gangs are connected to the raising and lowering mechanism, which has been previously described and illustrated in Figures 1, 2 and 3, it is obvious that, as the raising and lowering mechanism is operated, the front gangs will be raised and lowered at the same time as the rear gangs. As has been previously described, for the sequence of operation of the raising and lowering mechanism, the push rods 57 are so connected that, as the raising and lowering mechanism is operated, the front gangs 80 will be raised entirely out of the ground before the rear gangs, so that it will be possible for the rear gangs to finish cultivating the row before they are completely raised out of the ground in transport position. Similarly, as the gangs are lowered for cultivating position, the front gangs will begin to cultivate first at the beginning of the row and the rear gangs will be later dropped, so that the cultivation of each row will be uniformly started.

It is evident that there has been disclosed a simple adjusting mechanism for a hydraulic lifting and lowering mechanism wherein the adjusting levers extend within easy reach of the operator's station, so that the front and rear implement gangs may be readily adjusted in ground engaging position; and, that the control lever for the hydraulic lifting mechanism for raising and lowering the implement gangs from ground engaging to transport position is also within easy reach of the operator's station. In addition, a simple cultivator implement for the rear of a tractor has been disclosed, which is readily adaptable for quick attaching to and detaching from the tractor.

It is to be understood that applicant has shown and described only a preferred embodiment of his improved implement attachment and adjusting mechanism for said attachment adapted to be connected to a power lift attachment for tractor mounted implements and that he claims as his invention all modifications falling within the scope of the appended claims.

What is claimed is:

1. The combination with a wheeled frame, of a plurality of implement gangs mounted on the front and rear ends of said wheeled frame for vertical movement, manually actuated means for adjusting the front and rear gangs simultaneously, and power mechanism for raising and lowering said implement gangs from ground engaging to transport position, the aforesaid manually actuated means mounted on said mechanism to have relative movement with respect to the same as the implement gangs are raised and lowered from ground engaging to transport position.

2. The combination with a wheeled frame, of an implement gang mounted on the front end of the wheeled frame for vertical movement, power mechanism for raising and lowering said implement gang from ground engaging to transport position mounted at the rear of the tractor, and manually actuated means operatively connected with the implement gang and mounted on said mechanism to have relative movement with respect to the same as the implement gang is raised and lowered from ground engaging to transport position.

3. The combination with a motor propelled vehicle, of a plurality of implement gangs mounted on the front and rear ends of said vehicle for vertical movement, manually actuated means for adjusting the front and rear gangs simultaneously, and power lift means actuated from the motor for raising and lowering said implement gangs from ground engaging to transport position, the aforesaid manually actuated means mounted on said power lift means to have relative movement with respect to the same as the implement gangs are raised and lowered from ground engaging to transport position.

4. The combination with a motor propelled vehicle, of a plurality of implement gangs mounted on the front and rear ends of said vehicle for vertical movement, power lift means actuated from the motor for raising and lowering said implement gangs from ground engaging to transporting position, and a plurality of manually actuated means for adjusting the front and rear gangs in ground engaging position, the aforesaid manually actuated means being laterally positioned on said power lift means to have relative movement with respect to the power lift means as the implement gangs are raised and lowered from ground engaging to transport position upon the operation of the power lift means.

5. The combination with a motor propelled vehicle, of a plurality of implement gangs mounted on the vehicle for vertical movement comprising laterally spaced side gangs and an intermediate gang, a pair of laterally spaced manually actuated means for adjusting the implement gangs, equalizing means pivoted on the intermediate implement gang and oscillating in a plane extending across the gang, lift connections connected to said equalizing means and said laterally spaced side gangs, means on said laterally spaced manually actuated means for connecting the aforesaid lift connections whereby each manually actuated means will have connected thereto a lift connection for a side gang and a lifting connection to one end of the equalizing means, power lift means actuated from the motor for raising and lowering said implement gangs comprising a pair of crank portions adapted to be operated to and fro and extending to each side of the vehicle, and each manual actuating means mounted on a crank portion at the side of the vehicle corresponding to the gangs to be adjusted on that side of the vehicle.

6. The combination with a motor propelled vehicle, of a plurality of implement gangs mounted on the vehicle for vertical movement comprising a front set of gangs and a rear set of gangs, laterally spaced manually actuated means for adjusting the gangs whereby the gangs on each side of the vehicle may be independently adjusted in their ground engaging position, and power lift means actuated from the motor for raising and lowering said implement gangs comprising a means adapted to be operated to and fro, and said manually actuated means mounted on said to and fro means so as to have relative movement with respect to the same when the power lift operates to raise and lower the implement gangs.

7. The combination with a motor propelled vehicle, of a front and rear set of implement gangs mounted on the vehicle for vertical movement, laterally spaced manually actuated means for adjusting the working depth of the implement gangs, forwardly and rearwardly extending lift connections connected to the manually actuated adjusting means and to the front and rear set of gangs respectively, said rear set of gangs comprising side gangs and an intermediate gang, an equalizing means mounted on the intermediate gang and connected to the manually actuated adjusting means by two of the rearwardly extending lift connections, the remaining two rear lift connections connected to the side gangs, and the points of connection of said lifting connections on the manually actuated adjusting means being such that the front lift connections are intermediate the connections of the rear gangs, the points of connection of the side rear gangs being ahead of the intermediate rear gang, power lift means actuated from the motor for raising and lowering said implement gangs having a means adapted to be operated to and fro, means for mounting said manually actuated means on said to and fro means for movement with respect thereto, and means for guiding the movement of the manually actuated means when the same is operated by said to and fro means.

8. The combination with a motor propelled vehicle, an implement mounted for movement on the front of the vehicle, another implement mounted for movement on the rear of the vehicle, power means actuated from the motor for imparting oscillatory movement having an output oscillatory means, and means for so connecting the implements to the oscillatory means as to effect successive movement of the front and rear implements respectively in one direction of the oscillatory movement of said power means.

9. The combination with a motor propelled vehicle, of power means actuated from the motor for imparting oscillatory movement having an oscillatory output means, crank means on said output means, means mounted on said crank means for relative movement with respect thereto, means for guiding the throw of said means on the crank means to positively bring about a difference in the timing of effective movement of points on said means, a plurality of implements mounted on said vehicle for movement to or from their working position, and means connecting each implement at different points to said means on the crank means, whereby successive movement of the implements to or from their working position will be effected in one direction of the oscillatory movement of said power means.

10. The combination with a motor propelled vehicle, of a plurality of implements mounted on said vehicle for movement to or from their working position, power means actuated from the motor for imparting oscillatory movement having an oscillatory output means, crank means on said output means, manually actuated means for adjusting the working depth of said implements mounted on said crank means for relative movement with respect thereto, means for guiding the throw of said manually actuated means to positively bring about a difference in the timing of effective movement of points on said manually actuated means, and means for connecting each implement at different points to said manually actuated means, whereby successive movement of the implements to or from their working position will be effected in one direction of the oscillatory movement of said power means.

11. The combination with a motor propelled vehicle, of a plurality of implement gangs mounted on the vehicle for vertical movement, power lift means actuated from the motor for moving the implement gangs to and from their ground engaging position having output shaft means adapted for oscillatory movement, manually actuated means for adjusting the working depth of the implement gangs, said manually actuated means comprising an adjusting quadrant and an adjusting lever, means for connecting each of the implements to the adjusting lever, and means for so connecting the quadrant to said oscillatory shaft as to effect successive movement of the implements in one direction of the oscillatory movement thereof.

12. The combination with a motor propelled vehicle, of a plurality of implement gangs mounted on the vehicle for vertical movement comprising a front set of gangs and a rear set of gangs, laterally spaced manually actuated means for adjusting the working depth of the gangs, connection means between each of the gangs and the manually adjusting means, the points of connection of the implements being different on the manually actuated means, power lift means for raising and lowering said implement gangs comprising an oscillatory means, and means for mounting the manually actuated means on said oscillatory means to effect successive operation of the front and rear sets of gangs.

13. The combination with a motor propelled vehicle, of a front and rear set of implement gangs mounted on the vehicle for vertical movement, laterally spaced manually actuated means for adjusting the working depth of the implement gangs, forwardly and rearwardly extending lift connections connected to the manually actuated adjusting means and to the front and rear set of gangs respectively, said rear set of gangs comprising side gangs and an intermediate gang, an equalizing means mounted on the intermediate gang and connected to the manually actuated adjusting means by two of the rearwardly extending lift connections, the remaining two rear lift connections being connected to the side gangs, the points of connection of said lifting connections on the manually actuated adjusting means being such that the front lift connections are intermediate the connections of the rear gangs, the points of connection of the side rear gangs being ahead of the intermediate rear gang, power lift means actuated from the motor for raising and lowering said implement gangs having an output means adapted to be operated to and fro, crank means on said output means, means for mounting said manually actuated means on said crank means for movement with respect thereto, and means for guiding the throw of the manually actuated means when the to and fro means is operated whereby, due to the arrangement of the points of connections, the crank means, the movement of the manually adjusting means with respect to the crank means, and the guiding means, successive operation of the front and rear set of gangs respectively will be effected on movement in one direction of the to and fro means.

14. The combination with a tractor, of implements mounted for movement on the front portion of the tractor and at the sides thereof, other implements mounted for movement on the rear portion of the tractor and at the sides thereof, means for adjusting the depth of the front and rear implements on one side of the tractor independently of the front and rear implements on the other side of the tractor, power operable means for raising and lowering all of the implements, and means for so connecting the implements to the power operated means as to provide successive movement of the front implements on both sides of the tractor and the rear implements on both sides of the tractor respectively upon operation of the power means.

HIRAM P. SMITH.